United States Patent [19]

Longfield

[11] 4,434,275
[45] Feb. 28, 1984

[54] POLYEPICHLOROHYDRIN ELASTOMERS HAVING IMPROVED RESISTANCE TO SOUR GASOLINE

[75] Inventor: James E. Longfield, Basking Ridge, N.J.

[73] Assignee: American Cyanamid Company, Stamford, Conn.

[21] Appl. No.: 421,949

[22] Filed: Sep. 23, 1982

[51] Int. Cl.³ .............................................. C08L 71/02
[52] U.S. Cl. ................................... 525/403; 524/492; 524/300; 524/430
[58] Field of Search ......................................... 525/403

[56] References Cited

U.S. PATENT DOCUMENTS

| | | | |
|---|---|---|---|
| 3,951,927 | 4/1976 | Aloia | 525/535 |
| 3,985,708 | 10/1976 | Chang et al. | 528/205 |
| 4,000,213 | 12/1976 | Chang | 525/535 |
| 4,028,305 | 6/1977 | Li et al. | 528/294 |
| 4,093,599 | 6/1978 | Aloia | 528/373 |
| 4,255,561 | 3/1981 | Wood et al. | 525/403 |

*Primary Examiner*—Melvyn I. Marquis
*Attorney, Agent, or Firm*—Steven J. Hultquist; William H. Calnan

[57] ABSTRACT

Vulcanizable polyepichlorohydrin elastomers which, upon vulcanization, exhibit improved resistance to sour gasoline are prepared by incorporating thereinto an amount of a polythiodiethanol elastomer.

11 Claims, No Drawings

POLYEPICHLOROHYDRIN ELASTOMERS HAVING IMPROVED RESISTANCE TO SOUR GASOLINE

This invention relates to new, vulcanizable polyepichlorohydrin elastomers. More particularly, it relates to elastomeric mixtures of certain polythiodiethanol elastomers and polyepichlorohydrin elastomers which, upon vulcanization, exhibit improved resistance to degradation by sour gasoline.

Polyepichlorohydrin elastomers, such as epichlorohydrin homopolymers and copolymers of epichlorohydrin and ethylene oxide, have been used as materials of construction for hoses and tubing in the automotive market since the advent of unleaded fuels in 1972.

However, in 1977 it was discovered that hose failure of these materials occurred in some cars equipped with electronic fuel injection systems. These failures were found to be caused by sour gasoline, that is, gasoline containing peroxides. The failure of the copolymer of epichlorohydrin and ethylene oxide is caused by depolymerization. While the failure of epichlorohydrin homopolymer is less than the epichlorohydrin-ethylene oxide copolymer, it is nevertheless significantly degraded by sour gasoline.

While efforts to improve the sour gasoline resistance of these materials have been reported, see, for example, Zwickert and MacArthur, "Rubber & Plastics News," Dec. 21, 1981, pgs 16-19, there is still a need for improvement of their sour gasoline resistance.

SUMMARY OF THE INVENTION

The present invention provides a method for improving the sour gasoline stability of a vulcanizable polyepichlorohydrin elastomer which comprises incorporating thereinto a polythiodiethanol represented by the formula:

$$H\text{-}[OG]_n\text{-}OH \qquad (I)$$

wherein $-[OG]-$ comprises a copolymer of randomly alternating structural units selected from:

(A) structural units $$-[OC_2H_4SC_2H_4]- \qquad (II)$$

and $$-[OR]- \qquad (III)$$

wherein R represents one or more radicals remaining on removal of two hydroxyl groups from (a) saturated aliphatic linear, branched chain or cyclic diols, or (b) aliphatic linear, branched chain or cyclic diols containing external unsaturation having an allylic hydrogen atom; and (B) structural units (II), (III), and $$-[OR']- \qquad (IV)$$

wherein R' represents the radical remaining on removal of two hydroxyl groups from a diphenolic compound; said copolymer comprising structural units selected from (A) and (B) being characterized in that (1) n is an integer sufficient to provide in said copolymer a molecular weight of at least about 2000, (2) the molar ratio of structural units (II) to (III), when the polymer comprises structural units (A), or the molar ratio of structural units (II) to the total of (III) and (IV), when the polymer comprises structural units (B), being not less than 1:1, and (3) the copolymer contains from about 1 to 10 mole percent of said diol (b), based on the total of all units (II), (III), and (IV) present in said copolymer. The polythiodiethanol elastomer is incorporated into the polyepichlorohydrin elastomer in an amount sufficient to reduce the degradation thereof by sour gasoline.

Preferably, the polythiodiethanol elastomer is incorporated into the polyepichlorohydrin in an amount equal to at least about 5 parts, by weight, per 100 parts, by weight, of the polyepichlorohydrin. Most preferably, from about 10 to about 40 parts by weight of said elastomer of polythiodiethanol are incorporated per hundred parts by weight of polyepichlorohydrin.

The invention also pertains to the vulcanizable compositions obtained by the aforedescribed method and to the vulcanized elastomers obtained therefrom.

The compositions of the present invention provide improved resistance to degradation by sour gasoline, particularly an improved resistance to loss in tensile strength and hardness. It is particularly surprising that a mixture of elastomers achieves such improved resistance to chemical degradation.

DETAILED DESCRIPTION OF THE INVENTION

The elastomers of polythiodiethanol which have been found to provide enhanced resistance to sour gasoline degradation of polyepichlorohydrin elastomers are described, for example, by Aloia, U.S. Pat. No. 3,951,927; Chang et al, U.S. Pat. No. 3,985,708; Chang, U.S. Pat. No. 4,000,213; Li et al, U.S. Pat. No. 4,028,305; and, Aloia, U.S. Pat. No. 4,093,599, all of which are incorporated herein by reference thereto.

Exemplary of such elastomers are those comprising at least about 50-mole percent of thiodiethanol, up to about 49-mole percent of one or more saturated aliphatic diols, for example, diethylene glycol, and about 1 to 10-mole percent of an unsaturated aliphatic diol, for example, trimethylolpropane monoallyl ether. A preferred polythiodiethanol elastomer comprises about 70 to 85-mole percent thiodiethanol, about 5 to 29-mole percent of one or more saturated aliphatic diols, and about 1 to 10-mole percent trimethylolpropane monoallyl ether.

The polythiodiethanol elastomer may be prepared by first condensing thiodiethanol, or a mixture of a major proportion of thiodiethanol with one or more aliphatic diols, including about 1 to 10-mole percent of an unsaturated diol, optionally with a dihydroxy phenolic compound, in the presence of an acidic dehydrating catalyst, preferably phosphorous acid, at a temperature of about 150° to 200° C. until a low molecular weight, hydroxyl-terminated polymer is obtained. To this low molecular weight polymer is then added an additional catalyst, for example, sulfuric acid, and the condensation reaction is continued at 175°-200° C. under vacuum in a high-shear mixer, until the desired molecular weight is obtained.

The elastomeric mixtures of the invention can be cured into useful elastomeric products by casting or by conventional compounding and vulcanization using standard compounding techniques. Thus, in certain instances where the mixtures are viscous liquids they may be mixed with a cross-linking agent, such as benzoyl peroxide or dicumyl peroxide, poured into a suitable mold and cured by heating at an appropriate temperature. Alternatively, the higher molecular weight gums may be compounded on standard rubber processing equipment with conventional compounding ingredients, such as carbon black or other pigments and fillers, conventional, non-elemental sulfur polyepichlorohydrin vulcanizing agents, promoters such as zinc oxide, lubricants and mold release agents, antioxidants, plasticizers and the like, and compression molded into useful elastomeric products.

The conventional non-elemental sulfur polyepichlorohydrin vulcanizing agents referred to above include 2-mercaptoimidazolines, 2-mercaptopyrimidines and trithiocyanuric acid and its derivatives (U.S. Pat. No. 3,787,376). When the 2-mercaptoimidazolines or 2-mercaptopyrimidines are used, a metal compound selected from the aromatic carboxylic acid salts, saturated aliphatic carboxylic acid salts, carbonates, phosphates, silicates and oxides of metals of Groups IIA, IIB and IVA of the periodic table is usually employed as a vulcanization aid (U.S. Pat. No. 3,341,491). When trithiocyanuric acid or a derivative is used, the use of the above metal compounds as vulcanization aids is also preferred. Especially preferred vulcanization systems include a combination of 2-mercaptoimidazoline (aka ethylene-thiourea) and red lead, a combination of trithiocyanuric acid and magnesium oxide, and a combination of trithiocyanuric acid, magnesium oxide and calcuim carbonate.

The effects of sour gasoline may be determined in the laboratory by immersing the vulcanized elastomer in sour gasoline at 40° C. for periods of time and comparing its physical properties to the corresponding properties of the vulcanized elastomer before exposure to the sour gasoline.

The following examples are illustrative of the present invention and are not to be taken as being limitative thereof. All parts and percentages are by weight unless otherwise indicated.

EXAMPLE 1

An elastomeric composition of the present invention was prepared by milling the ingredients shown below on a standard two-roll rubber mill.

| Component | Parts by Weight |
| --- | --- |
| Epichlorohydrin-ethylene oxide elastomer* | 80.0 |
| Copolymer: 85-mole percent thiodiethanol, 10-mole percent diethylene glycol and 5-mole percent trimethylolpropane monoallyl ether | 20.0 |
| N774 Carbon Black | 85.0 |
| Paraplex ® G-50 (a plasticizer made by Rohm & Haas) | 7.0 |
| Dioctyl Phthalate | 8.0 |
| Red Lead | 5.0 |
| Stearic Acid | 1.6 |
| END-75 (75% dispersion of ethylene thiourea in ethylene/propylene/diene monomer - a vulcanizing agent made by Wyrough & Loser, Trenton, N.J.) | 1.6 |

*Herclor C (Hercules, Inc.)

The resulting blend was mold-cured at 320° F. for 30 minutes into a 6 inch ×6 inch ×0.0625 inch test sheet and the physical properties of the sheet were measured initially, and after immersion in sour fuel for 7 and 14 days. The results are set forth in Table I.

TABLE I

| Physical Properties | Initially | After Immersion | |
| --- | --- | --- | --- |
| | | 7 Days | 14 Days |
| Tensile Strength, psi | 1245 | 705 | 580 |
| % Elongation at Break | 265 | 245 | 300 |
| Hardness, Shore A | 70 | 55 | 53 |
| 100% Modulus, psi | 535 | 310 | 240 |
| % Volume Change | — | 7.0 | 7.5 |

EXAMPLE 2

For comparison, the procedure of Example 1 was followed in every detail except that the copolymer of 85-mole percent thiodiethanol, 10-mole percent diethylene glycol and 5-mole percent trimethylolpropane monoallyl ether was omitted from the ingredients and the amount of epichlorohydrin-ethylene oxide copolymer was increased to 100 parts by weight. The physical properties of the 6 inch ×6 inch ×0.0625 inch test sheet product are set forth in Table II.

TABLE II

| Physical Properties | Initially | After Immersion | |
| --- | --- | --- | --- |
| | | 7 Days | 14 Days |
| Tensile Strength, psi | 1525 | 510 | decomposed[△] |
| % Elongation at Break | 300 | 260 | " |
| Hardness, Shore A | 70 | 50 | " |
| 100% Modulus, psi | 600 | 185 | " |
| % Volume Change | — | 9.5 | 11.0 |

[△]soft and cracked

EXAMPLE 3

An elastomeric composition was prepared by milling the ingredients shown below on a standard two-roll rubber mill.

| Component | Parts by Weight |
| --- | --- |
| Polyepichlorohydrin elastomer* | 80.0 |
| Copolymer: 85-mole percent thiodiethanol, 10-mole percent diethylene glycol and 5-mole percent trimethylolpropane monoallyl ether | 20.0 |
| N774 Carbon Black | 85.0 |
| Paraplex ® G-50 | 7.0 |
| Dioctyl Phthalate | 8.0 |
| Red Lead | 8.0 |
| Stearic Acid | 1.6 |
| END-75 | 1.6 |

*Herclor H (Hercules, Inc.)

The resulting blend was mold-cured at 320° F. for 22 minutes and the physical properties of the resulting test sheet were measured initially, and after immersion in sour gasoline for 3, 7, and 14 days. The measurements are set forth in Table III.

TABLE III

| Physical Properties | Initially | After Immersion | | |
| --- | --- | --- | --- | --- |
| | | 3 Days | 7 Days | 14 Days |
| Tensile Strength, psi | 1410 | 1021 | 902 | 818 |
| % Elongation at Break | 220 | 187 | 175 | 192 |
| Hardness, Shore A | 70 | 58 | 58 | — |
| 100% Modulus, psi | 700 | 517 | 503 | 154 |
| % Volume Change | — | 10.57 | 8.66 | 7.91 |

EXAMPLE 4

For comparison, the procedure of Example 3 was followed in every detail except that the copolymer of 85-mole percent thiodiethanol, 10-mole percent diethylene glycol and 5-mole percent trimethylolpropane monoallyl ether was omitted from the ingredients and the amount of polyepichlorohydrin elastomer was increased to 100 parts by weight. The physical properties of the test sheet are set forth in Table IV.

TABLE IV

| Physical Properties | Initially | After Immersion | | |
|---|---|---|---|---|
| | | 3 Days | 7 Days | 14 Days |
| Tensile Strength, psi | 1315 | 873 | 553 | 254 |
| % Elongation at Break | 270 | 196 | 222 | 250 |
| Hardness, Shore A | 75 | 56 | 52 | — |
| 100% Modulus, psi | 660 | 401 | 257 | 119 |
| % Volume Change | — | 13.33 | 11.06 | 9.63 |

Comparison of the data of Examples 1 and 2, and 3 and 4, respectively, shows that the presence of the polythiodiethanol elastomer significantly retards deterioration of the vulcanized elastomer by sour fuel.

EXAMPLE 5

The procedure of Example 1 is repeated in every detail except that the polythiodiethanol elastomer comprises 5 parts, by weight, of the mixture, and contains 90-mole percent thiodiethanol and 10-mole percent glycerol monoallyl ether. The physical properties of the test sheet product are similar to those of Examples 1 and 3, in that they are superior to the corresponding properties for a test sheet which does not contain the polythiodiethanol elastomer.

EXAMPLE 6

The procedure of Example 1 is repeated in every detail except that the epichlorohydrin-ethylene oxide elastomer comprises 100 parts, by weight, of the mixture, and the polythiodiethanol elastomer comprises 5 parts, by weight, of the mixture and contains 95-mole percent thiodiethanol and 5-mole percent 3-cyclohexene-1,1-dimethanol. The physical properties of the test sheet product are similar to those of Examples 1 and 3 in that they are superior to the corresponding properties for a test sheet which does not contain the polythiodiethanol elastomer.

What is claimed is:

1. A vulcanizable mixture comprising a polyepichlorohydrin elastomer and a sour gasoline degradation reducing effective amount of a polythiodiethanol elastomer represented by the formula:

$$H\text{-}[OG]_n\text{-}OH$$

wherein $-[OG]-$ comprises a copolymer of randomly alternating structural units selected from: (A) Structural units $-[OC_2H_4SC_2H_4]-$ (II) and $-[OR]-$ (III), wherein R represents one or more radicals remaining on removal of two hydroxyl groups from (a) saturated aliphatic linear, branched chain or cyclic diols, or (b) aliphatic linear, branched chain or cyclic diols containing external unsaturation having an allylic hydrogen atom; and (B) structural units [II], [III] and $-[OR']-$, wherein R' represents the radical remaining on removal of two hydroxyl groups from a diphenolic compound; said copolymer comprising structural units selected from (A) and (B) being characterized in that (1) n is an integer sufficient to provide in said copolymer a molecular weight of at least about 2000, (2) the molar ratio of structural units $-[OC_2H_4SC_2H_4]-$ to $-[OR]-$, when the polymer comprises structural units (A), or the molar ratio of structural units $-[OC_2H_4SC_2H_4]-$ to the total of $-[OR]-$ and $-[OR']-$, when the polymer comprises structural units (B), being not less than 1:1, and (3) the copolymer contains from about 1 to 10 mole percent of said diol (b), based upon the total of all structural units $-[OC_2H_4SC_2H_4]-$, $-[OR]-$ and $-[OR']-$ present in the copolymer.

2. The mixture of claim 1 wherein the polythiodiethanol elastomer comprises at least about 5 parts, by weight, based upon 100 parts by weight, of the polyepichlorohydrin elastomer.

3. The mixture of claim 1 wherein the polythiodiethanol elastomer comprises from about 10 to 40 parts by weight, based upon 100 parts, by weight, of the polyepichlorohydrin elastomer.

4. The mixture of claim 1, 2 or 3 wherein the polythiodiethanol elastomer comprises at least about 50-mole percent thiodiethanol, about 1 to 10-mole percent trimethylolpropane monoallyl ether and, optionally up to about 49-mole percent of one or more saturated aliphatic diols.

5. The mixture of claim 1, 2 or 3 wherein the polythiodiethanol elastomer comprises about 70 to 85-mole percent thiodiethanol, about 5 to 29-mole percent of one or more saturated aliphatic diols, and about 1 to 10-mole percent trimethylolpropane monoallyl ether.

6. The mixture of claim 1, 2 or 3, the polyepichlorohydrin elastomer is a homopolymer of epichlorohydrin or a copolymer of epichlorohydrin and ethylene oxide.

7. A method for reducing the degradation by sour gasoline of a vulcanized polyepichlorohydrin elastomer which comprises adding to said elastomer, prior to vulcanization, a sour gasoline degradation reducing effective amount of a polythiodiethanol elastomer represented by the formula:

$$H\text{-}[OG]_n\text{-}OH$$

wherein $-[OG]-$ comprises a copolymer of randomly alternating structural units selected from:
(A) structural units $-[OC_2H_4SC_2H_4]-$ (II) and $-[OR]-$ (III), wherein R represents one or more radicals remaining on removal of two hydroxyl groups from (a) saturated aliphatic linear, branched chain or cyclic diols, or (b) aliphatic linear, branched chain or cyclic diols containing external unsaturation having an allylic hydrogen atom; and
(B) structural units (II), (III) and $-[OR']-$, wherein R' represents the radical remaining on removal of two hydroxyl groups from a diphenolic compound; said copolymer comprising structural units selected from (A) and (B) being characterized in that (1) n is an integer sufficient to provide in said copolymer a molecular weight of at least about 2000, (2) the molar ratio of structural units $-[OC_2H_4SC_2H_4]-$ to $-[OR]-$, when the polymer comprises structural units (A), or the molar ratio of structural units $-[OC_2H_4SC_2H_4]-$ to the total of $-[OR]-$ and $-[OR']-$, when the polymer comprises structural units (B), being not less than 1:1, and (3) the copolymer contains from about 1 to 10 mole percent of said diol (b), based upon the total of all structural units $-[-OC_2H_4SC_2H_4-]-$, $-[-OR-]-$ and $-[-OR'-]-$ present in the copolymer.

8. The method of claim 7 wherein the amount of polythiodiethanol elastomer added to the polyepichlorohydrin elastomer is at least about 5 parts by weight, based upon 100 parts, by weight, of the polyepichlorohydrin elastomer.

9. The method of claim 7 wherein the amount of polythiodiethanol elastomer added is from about 10 to 40 parts by weight, based upon 100 parts, by weight, of the polychlorohydrin elastomer.

10. The vulcanized product obtained from the mixture of claim 1 or 2.

11. The vulcanized product obtained from the mixture of claim 4.

* * * * *